US012808793B2

(12) United States Patent
Chakraborty et al.

(10) Patent No.: US 12,808,793 B2
(45) Date of Patent: Nov. 24, 2026

(54) TERAHERTZ TIME DOMAIN SPECTROSCOPY IMAGING MARKERS USING MAXIMUM A POSTERIORI PROBABILITY (MAP) ESTIMATION

(71) Applicant: University of Rochester, Rochester, NY (US)

(72) Inventors: Debamitra Chakraborty, Rochester, NY (US); Roman Sobolewski, Rochester, NY (US); Bradley N. Mills, Rochester, NY (US); Scott A. Gerber, Rochester, NY (US)

(73) Assignee: University of Rochester, Rochester, NY (US)

( * ) Notice: Subject to any disclaimer, the term of this patent is extended or adjusted under 35 U.S.C. 154(b) by 144 days.

(21) Appl. No.: 18/817,175

(22) Filed: Aug. 27, 2024

(65) Prior Publication Data

US 2025/0067666 A1 Feb. 27, 2025

Related U.S. Application Data

(60) Provisional application No. 63/579,024, filed on Aug. 27, 2023.

(51) Int. Cl.
*G01N 21/3586* (2014.01)
*G01N 21/41* (2006.01)
*G01N 21/59* (2006.01)

(52) U.S. Cl.
CPC ......... *G01N 21/3586* (2013.01); *G01N 21/41* (2013.01); *G01N 21/59* (2013.01)

(58) Field of Classification Search
CPC .... G01N 21/3586; G01N 21/41; G01N 21/59; G01N 21/84; A61B 5/0507
See application file for complete search history.

(56) References Cited

U.S. PATENT DOCUMENTS

2022/0326151 A1* 10/2022 Krivitskiy .......... G01B 9/02041

OTHER PUBLICATIONS

Chakraborty et al., "Maximum A-Posteriori Probability (MAP) Terahertz Parameter Extraction for Pancreatic Ductal Adenocarcinoma," 47th International Conference on Infrared, Millimeter and Terahertz Waves (IRMMW-THz) (2022, pp. 1-2) (Year: 2022).*

* cited by examiner

*Primary Examiner* — Kiho Kim
(74) *Attorney, Agent, or Firm* — Hodgson Russ LLP

(57) ABSTRACT

The present disclosure provides systems and methods for extracting one or more imaging markers of a THz-TDS scan. An embodiment of a method includes obtaining an image of a sample using pulsed terahertz time-domain spectroscopy and determining the one or more imaging markers using a maximum a posteriori probability (MAP) estimation applied to the obtained image. The one or more imaging markers may be a refractive index and an absorption coefficient. An embodiment of a system includes a THz-TDS apparatus having a processor configured to perform a method of the present disclosure—for example, to determine the one or more imaging markers using a maximum a posteriori probability estimation.

18 Claims, 12 Drawing Sheets

(a) Coefficient of variation (CV)

| Peak amplitude | Peak to peak amplitude | Spectral peak | Spectral magnitude at 0.5 THz | Spectral magnitude at 1 THz | Refractive index ($n$) from FD | Absorption coefficient ($\alpha$) from FD | Refractive index ($n$) from MAP | Absorption coefficient ($\alpha$) from MAP |
|---|---|---|---|---|---|---|---|---|
| 0.04 | 0.04 | 0.04 | 0.03 | 0.06 | 0.04 | 0.34 | **0.002** | **0.38** |
| 0.49 | 0.51 | 0.33 | 0.61 | 0.91 | 0.04 | 0.11 | **0.008** | **0.07** |
| 0.21 | 0.21 | 0.17 | 0.24 | 0.55 | 0.03 | 0.17 | **0.008** | **0.08** |

Paraffin Normal Pancreas PDAC (b) Interquartile range (IQR)

| Peak amplitude (mV) | Peak to peak amplitude (mV) | Spectral peak (a.u.) | Spectral magnitude at 0.5 THz (a.u.) | Spectral magnitude at 1 THz (a.u.) | Refractive index ($n$) from FD | Absorption coefficient ($\alpha$) from FD ($mm^{-1}$) | Refractive index ($n$) from MAP | Absorption coefficient ($\alpha$) from MAP ($mm^{-1}$) |
|---|---|---|---|---|---|---|---|---|
| 4.30 | 5.44 | 28674.48 | 18340.51 | 14833.68 | 0.08 | 0.13 | **0.004** | **0.10** |
| 29.96 | 41.16 | 106134.14 | 132680.33 | 43214.35 | 0.11 | 0.07 | **0.023** | **0.04** |
| 11.60 | 15.78 | 51384.07 | 54177.93 | 12088.47 | 0.03 | 0.36 | **0.022** | **0.08** |

Paraffin Normal Pancreas PDAC

Fig. 10 (Table 1)

TERAHERTZ TIME DOMAIN SPECTROSCOPY IMAGING MARKERS USING MAXIMUM A POSTERIORI PROBABILITY (MAP) ESTIMATION

CROSS-REFERENCE TO RELATED APPLICATIONS

This application claims priority to U.S. Provisional Application No. 63/579,024, filed on Aug. 27, 2023, the disclosure of which is incorporated herein by reference.

FIELD OF THE DISCLOSURE

The present disclosure relates to terahertz (THz) time domain spectroscopy (TDS), and in particular, to the use of THz-TDS in characterizing tissue samples.

BACKGROUND OF THE DISCLOSURE

Comprehensive tumor characterization requires multiplexed immunohistochemistry assays that are expensive and time-consuming given the large number of molecular targets needed to identify and validate each tumor property. There is a crucial need for new technologies, such as terahertz time-domain spectroscopy (THz-TDS), which can provide cost effective image-based techniques for probing and identifying the complex tumor microenvironment. Hence, THz time-domain spectroscopy can be applied to probe tissue samples. The THz-TDS technique is a label-free, noninvasive, and nonionizing tool for biomedical imaging, especially in tumor prognosis. THz radiation lacks the energy to break chemical bonds or ionize molecules/atoms in studied tissues, making it harmless to living organisms, in contrast to much higher energy photons such as ultraviolet light or, especially, X-rays. THz-TDS provides submillimeter spatial resolution and molecular fingerprinting by providing both the frequency and time-domain information and could be capable of detecting pancreatic cancers.

However, despite extensive research using on the THz-TDS technique, there is a lack of standardized THz imaging markers to map out the tissue properties. Presently, there are mainly two approaches to report the difference between the tumor and normal tissues; the first is to map an image of time- or frequency-domain signal amplitudes measured at corresponding locations, i.e., the maximum amplitude of the signal from the tumor sample, normalized with respect to a reference (either an empty setup or a healthy control) and the second is to report a difference in the tissue's optical parameters like the refractive index n and/or the absorption coefficient $\alpha$ in the THz frequency region. FIG. 1 presents a collection of features mapped in literature as imaging markers obtained from an experimentally acquired THz time domain (TD) pulse and its corresponding frequency spectrum obtained by fast Fourier transform (FFT). The lack of standardized, optimal imaging markers prevents reliable comparisons of data reported by different research groups. Since subtle changes in the tissue microenvironment can markedly impact material properties, there is a need for THz imaging markers that are unbiased and reproducible.

BRIEF SUMMARY OF THE DISCLOSURE

Pancreatic ductal adenocarcinoma (PDAC) is one of the significant reasons for cancer-related death in the United States due to a lack of timely prognosis and the poor efficacy of the standard treatment protocol. Immunotherapy-based neoadjuvant therapy, such as stereotactic body radiotherapy (SBRT), has shown promising results compared to conventional radiotherapy in strengthening the antitumor response in PDAC. To probe and quantify the antitumor response with SBRT, the present disclosure studies the tumor microenvironment using terahertz time-domain spectroscopy (THz-TDS). Since the tumor's complex microenvironment plays a key role in disease progression and treatment supervision, THz-TDS can be a revolutionary tool to help in treatment planning by probing the changes in the tissue microenvironment. In an experimental embodiment, this paper presents THz-TDS of paraffin-embedded PDAC samples utilizing a clinically relevant mouse model. The present disclosure provides a time-domain approximation method based on maximum a posteriori probability (MAP) estimation to extract terahertz parameters, namely, the refractive index and the absorption coefficient, from THz-TDS. Unlike the standard frequency-domain (FD) analysis, the parameters extracted from MAP construct better-conserved tissue parameters estimates, since the FD optimization often incorporates errors due to numerical instabilities during phase unwrapping, especially when propagating in lossy media. The THz-range index of refraction extracted from MAP and absorption coefficient parameters report a statistically significant distinction between PDAC tissue regions and their healthy equivalents. The coefficient of variation of the refractive index extracted by MAP is one order of magnitude lower compared to the one extracted from FD analysis. The index of refraction and absorption coefficient extracted from the MAP are suggested as the best imaging markers to reconstruct THz images of biological tissues to reflect their physical properties accurately and reproducibly. The obtained THz scans were validated using standard histopathology.

The present disclosure provides a method and technique used for the detection of various tumor microenvironments, such as tumor, edema, or fibrosis, using pulsed terahertz time-domain spectroscopy (TH-TDS) to obtain high-resolution images (e.g., 2-dimensional (2D) images). This is a computational method based on a mathematical model for detecting the tissue microenvironment by extracting optical (within THz bandwidth) imaging markers, namely the refractive index n and the absorption coefficient $\alpha$, directly from the raw THz-TDS signals. Since the physical characteristics of constituents of a particular type of tissue region can be best reflected by the above n and $\alpha$ markers, using them to create 2D imaging maps can give an unbiased and reproducible way of detecting and visualizing various tissue regions. In previous techniques, the raw THz-TDS signals are converted first into the frequency domain, and then the corresponding electromagnetic wave propagation equations are solved in order to obtain n and $\alpha$ spectra of the tissue. The real part of n is derived by unwrapping the phase of these frequency-domain THz spectra, which introduces numerical instabilities and leads to non-reliable estimates of the n and subsequent a values. Also, phase unwrapping is highly dependent on the dynamic range of the frequency spectra and is therefore band limited such that one needs to arbitrarily weigh both the phase and amplitude while solving the problem in the frequency domain. Most importantly, phase unwrapping is intrinsically error-prone in the tumor regions where the raw THz-TDS signals are low since the transmitted THz signals get highly attenuated while traversing through lossy regions.

The present disclosure provides a novel, time-domain technique to extract n and $\alpha$ imaging markers directly from the raw THz-TDS signals. This method contains a maximum a posteriori probability (MAP) estimation of the imaging markers without resorting to a frequency-domain transformation of the THz pulses, and it does not involve any phase unwrapping procedure, making it robust to the phase unwrapping instabilities. Furthermore, the MAP method directly acquires high signal-to-noise ratio experimental signals for both the sample-under-test and the reference with femtosecond time resolution and very low noise. The latter allows one to obtain very accurate measurements of n and α within the analysis area, most notably tumor regions. In the MAP procedure, the reference pulse from an empty setup is passed through a filter that parametrically models the influence of wave propagation through the sample-under-test and produces a corresponding model sample pulse. In the next step, the filter parameters are optimized against the difference between the experimental sample pulse and modeled sample pulse as the objective function to obtain the imaging markers. This model also compensates for spurious multiple reflecting waves, as well as additive noise arising from both the detection electronics and laser power fluctuations used in the THz-TDS measurements. This gives us a straightforward way of noise-modeling, which is not possible using the aforementioned conventional frequency-domain analysis. The THz range n and α imaging markers extracted from the MAP procedure show a statistically significant distinction between various tumor tissue regions and their non-malignant equivalents. The coefficient of the refractive index variation extracted by MAP is at least one order of magnitude lower, as compared to that extracted from frequency-domain analysis. Hence, this technique gives a more robust and conservative extraction of the imaging markers, especially for detection within optically lossy tumor regions.

DESCRIPTION OF THE DRAWINGS

For a fuller understanding of the nature and objects of the disclosure, reference should be made to the following detailed description taken in conjunction with the accompanying drawings.

FIG. 10. Table 1—(a) Coefficient of Variation (CV) and (b) Interquartile Range (IQR) for the Common Features Used over the Literature along with the MAP-Extracted Parameters for Paraffin, Normal Tissue, and PDAC Regions.

DETAILED DESCRIPTION OF THE DISCLOSURE

Figure 1:
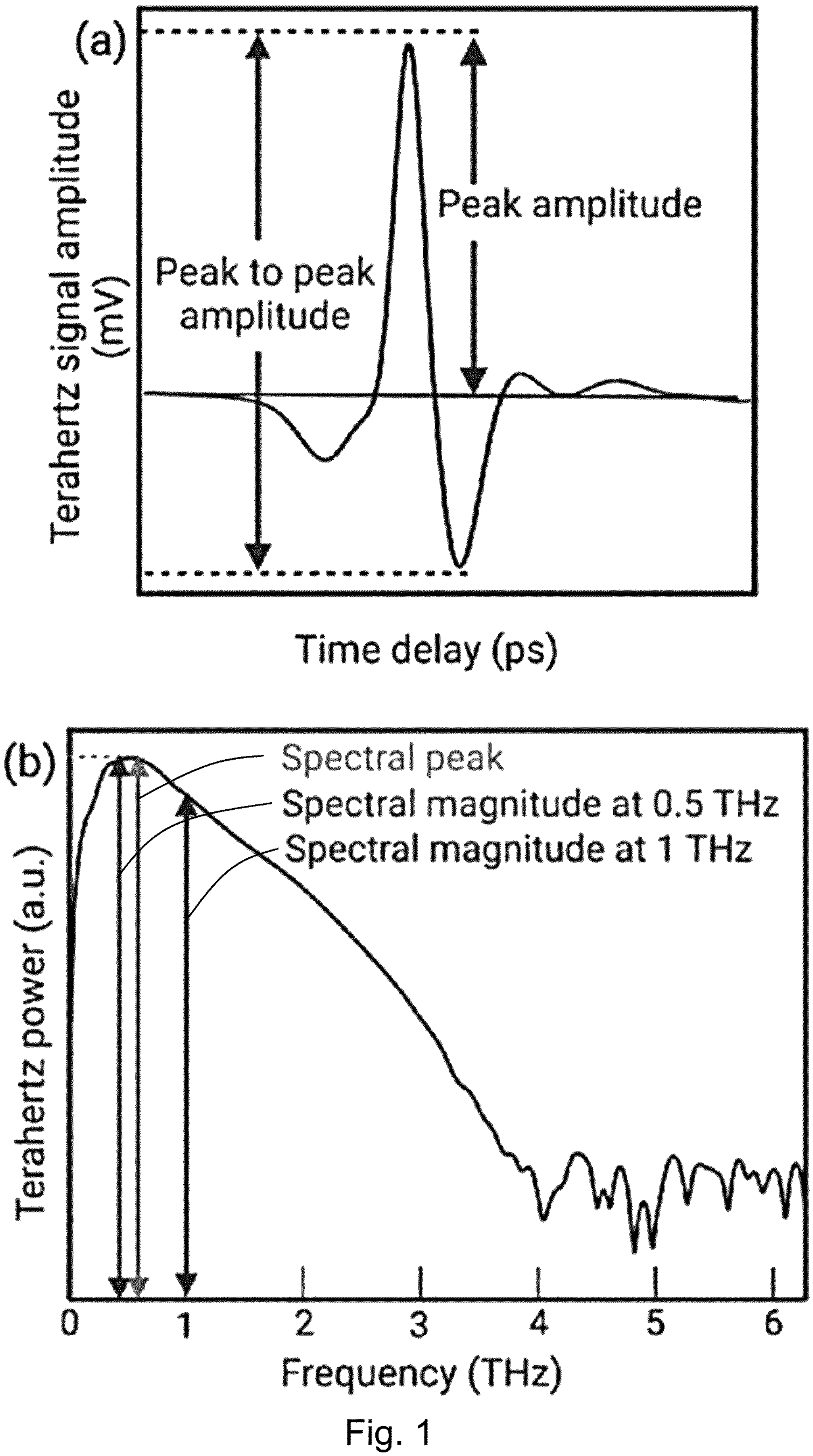
FIG. 1. Representative (a) pulsed time domain (TD) signal and (b) corresponding FD spectrum obtained from the TD pulse via the fast Fourier transfer (FFT) method. The conventional features used as imaging markers corresponding to the signal and spectrum are indicated. Created with BioRender.com, agreement no. LG24VWZ220.

Pancreatic ductal adenocarcinoma (PDAC) is an aggressively progressive malignancy that contributes to the third-highest number of cancer deaths in the United States. The total five-year survival rate is 9% due to the absence of timely diagnosis and inadequate response to conventional treatment procedures such as surgery, chemotherapy, and radiation therapy. More than 80% of PDAC patients are diagnosed with the advanced stage of the disease often after metastasis and, at the time of diagnosis, there are no curative treatments. The currently available serum biomarkers, like CA19-9, are insufficient to detect pancreatic cancer at an early stage due to their low specificity and sensitivity. At diagnosis, merely 20% of the patients qualify for a potentially curative pancreatectomy, and most patients, nevertheless, experience lethal recurrence and/or systemic metastases regardless of second-line intervention. The existing standard chemotherapy with "gemcitabine" has very narrow efficiency, extending the patient's overall survival by only 6-12 weeks. This poor performance of current standard treatments is often associated with the lack of understanding of the disease's complex biology, especially its heterogeneous microenvironment. Alternatively, immunotherapy approaches that often employ immune-priming neoadjuvants, such as stereotactic body radiotherapy (SBRT), aim to stimulate immunogenic tumor cell death and thereby educate and amplify the antitumor immune response. However, tumor cells are capable of mitigating DNA damage to escape cell death mechanisms, leading to both interpatient and intratumoral response variabilities. The present disclosure provides terahertz (THz) imaging techniques useful for mapping and measuring the cytotoxic responsivity of PDAC to neoadjuvant therapies, such as SBRT. Hence, probing the treated PDAC microenvironment using THz imaging can help to investigate whether a tumor is responding to or likely to respond to a given therapy. This information can then be used to assess the efficacy of neoadjuvant or first-line therapy and subsequently inform adjuvant and/or second-line treatment approaches. Currently, comprehensive tumor characterization requires multiplexed immunohistochemistry assays that are expensive and time-consuming given the large number of molecular targets needed to identify and validate each tumor property. Instead, THz time-domain spectroscopy (THz-TDS) based imaging can be performed to acquire the same level of information at a fraction of the cost.

According to the literature reviewed above, there is a crucial demand to develop new technologies with a novel imaging marker competent for probing and identifying the complex tumor microenvironment. Hence, THz time-domain spectroscopy (THz-TDS) can be applied to probe the heterogeneity in the PDAC microenvironment. The THz-TDS technique is a label-free, noninvasive, and nonionizing tool for biomedical imaging, especially in tumor prognosis. THz radiation lacks the energy to break chemical bonds or ionize molecules/atoms in studied tissues, making it harmless to living organisms, in contrast to much higher energy photons such as ultraviolet light or, especially, X rays. THz-TDS provides submillimeter spatial resolution and molecular fingerprinting by providing both the frequency and time-domain information and could be capable of detecting pancreatic cancers.

Extensive bioimaging research based on the THz-TDS technique has been conducted on various types of malignancy, both in vitro and ex vivo, with reports revealing significant differences in the tissue properties in tumors as compared to their healthy controls (referred in the literature to as a normal tissue). However, despite the availability of vast and rich literature, all these studies lack standardized THz imaging markers to map out the tissue properties. Presently, there are mainly two approaches to report the difference between the tumor and normal tissues: the first is to map an image of time- or frequency-domain signal amplitudes measured at corresponding locations, i.e., the maximum amplitude of the signal from the tumor sample, normalized with respect to a reference (either an empty setup or a healthy control) and the second is reporting a difference in the tissue's optical parameters like the refractive index n and/or the absorption coefficient $\alpha$ in the THz frequency region. FIG. 1 presents a collection of features mapped in literature as imaging markers obtained from an experimentally acquired THZ time domain (TD) pulse and its corresponding frequency spectrum obtained by fast Fourier transform (FFT). The lack of standardized, optimal imaging markers prevents reliable comparisons of data reported by different research groups. Since subtle changes in the tissue microenvironment can markedly impact material properties, there is a need for THz imaging markers that are unbiased and reproducible.

The present disclosure provides an optimized set of imaging markers extracted by a technique based on maximum a posteriori probability (MAP) estimation from pulsed THZ time-domain data for murine tissue with PDAC. The differences in optical parameters in the THZ region between different areas within the tissue could be attributed to heterogeneity in the tissue constituents. THz spectroscopy has demonstrated detectable contrasts in many freshly harvested biological tissues that can be attributed to differences in water content. Conversely, examples described in the present disclosure demonstrate the formalin-fixed paraffin-embedded (FFPE) tissues interrogated in the absence of water also show detectable THz contrast. We hypothesize that the presence of collagen and its variational density are major contributors to the observed contrasts in the microenvironments of FFPE PDAC tissues.

Since optical parameters can be the crucial markers for image reconstruction and understanding light-tissue interactions, accurately measuring them is necessary to provide reliable optical images at the THz range and their biophysical interpretation. In addition, the differences in imaging markers between normal and malignant tissues can be used to make a clinical diagnosis. Hence, efficient THz imaging markers capable of probing the tissue microenvironment can not only shed new light on the tumor prognosis but also can help in its treatment planning. In this present disclosure, PDAC is used as a non-limiting case study, but the presented approach could be used for any tumor characterized using a THz-TDS technique. In this disclosure, we report the first experimental evidence of THz-TDS probing PDAC tissues using time-resolved MAP estimation to reconstruct THz optical parameters. We refer to the THz refractive index and absorption coefficient as imaging markers that can delineate tissue heterogeneity within the PDAC microenvironment.

Figure 12:
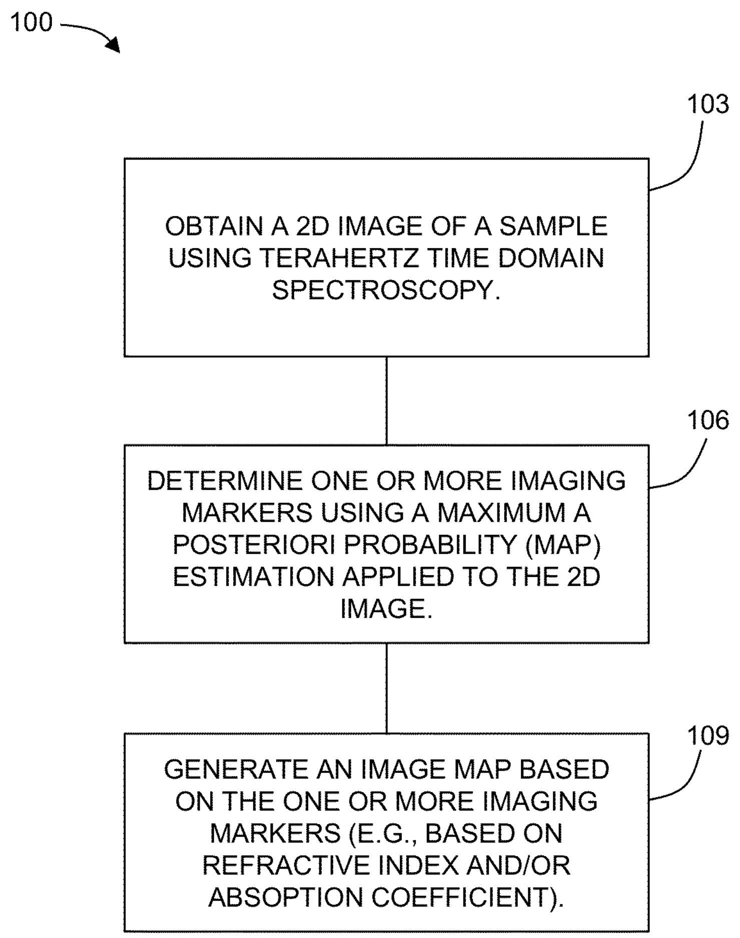
FIG. 12. A chart of a method for extracting one or more imaging markers according to another embodiment of the present disclosure.

With reference to FIG. 12, in a first aspect, the present disclosure may be embodied as a method 100 for extracting one or more imaging markers (i.e., refractive index (n), absorption coefficient ($\alpha$), or both) of a THz-TDS scan (i.e., of a sample). The method 100 includes obtaining 103 an image (e.g., a 2D image) of a sample using pulsed terahertz time-domain spectroscopy. The one or more imaging markers are determined 106 using a maximum a posteriori probability (MAP) estimation applied to the obtained image. For example, the one or more imaging markers may be determined 106 by minimizing an error between the obtained image ($E_{sam}$) and a modeled image ($E_{sam.model}$) in the time domain. The modeled image may be produced by passing a reference pulse ($E_{ref}$) through a filter that parametrically models the influence of wave propagation through the sample. In some embodiments, the filter may be a Fresnel function for a single dielectric layer in transmission geometry. For example, the filter may have a filter function ($K_\theta$) provided by $$K_\theta(\omega) = \beta\frac{4n}{(n+1)^2}e^{i\omega d/c(1-n)-\alpha d/2}$$

where $\beta$ is the amplitude scaling factor treated as Gaussian distribution of white noise, $\omega$ is angular frequency, d is sample thickness, and c is the speed of light (see further description below regarding Equation 3). Other filters may be used.

The error may be minimized using various techniques. For example, the error may be minimized according to $\hat{\theta}_{(n,\alpha)}=\|E_{sam}-F^{-1}\{K_\theta \cdot F\{E_{ref}\}\}\|^2$, where F is a fast Fourier transform (FFT) operator (see further description below regarding Equation 4). In some embodiments, the error is a mean-squared error. In some embodiments, the error is minimized using maximum likelihood estimation.

The imaging markers may be determined over the image area (i.e., for various points across the image area). In some embodiments, the method 100 further includes generating 109 an image map based on the one or more imaging markers—e.g., an image map based on the refractive index, an image map based on the absorption coefficient, or both image maps, which may be embodied in separate image maps or a consolidated image map having values for both refractive index and absorption coefficient.

Figure 2:
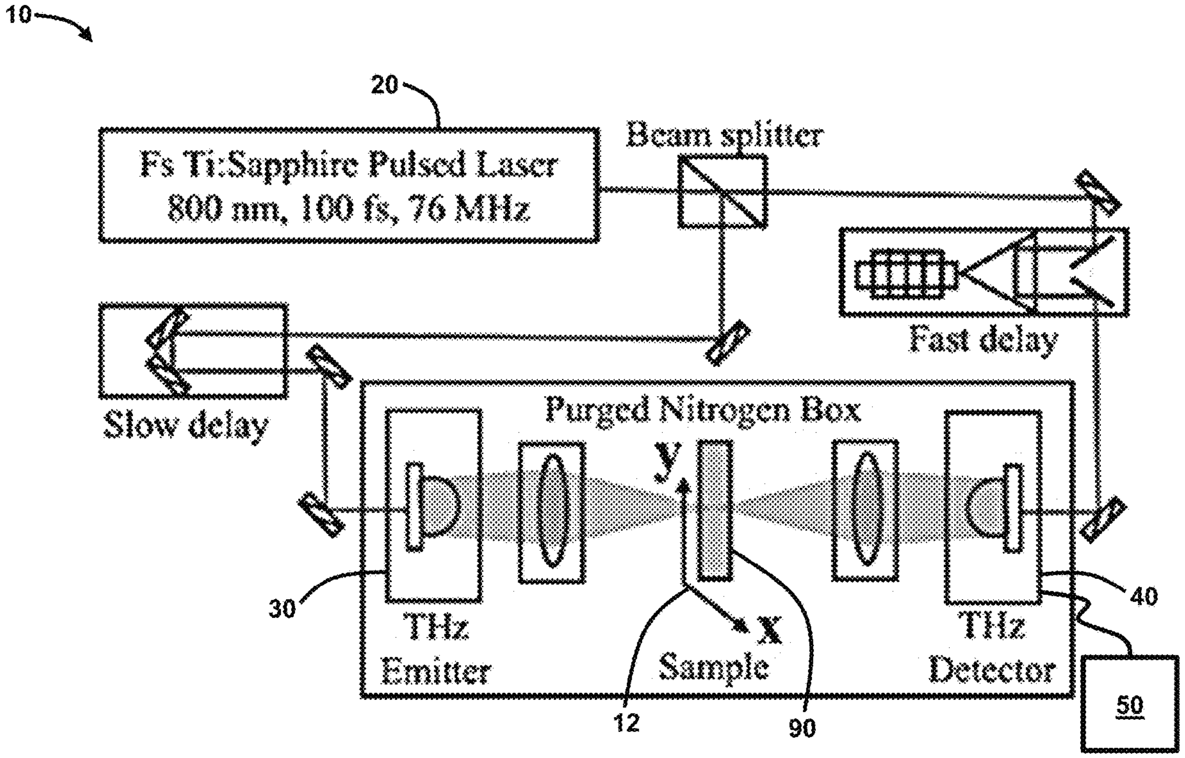
FIG. 2. A diagram of an example system for THz time domain spectroscopy according to an embodiment of the present disclosure.

With reference to FIG. 2, in another aspect, the present disclosure may be embodied as a system 10 for THz time domain spectroscopy of a sample 90. The system 10 includes a pulsed radiation generator 20 for generating a probe beam and a pump beam. For example, the pulsed radiation generator 20 may be a femtosecond laser producing a beam which is split (e.g., using a beam splitter, etc.) into a pump beam and a probe beam. Non-limiting examples of femtosecond lasers include Ti:sapphire lasers and fiber lasers (using doped materials such, for example, as erbium or ytterbium).

The system 10 includes an emitter 30 configured to emit a THz reference pulse ($E_{ref}$). The emitter may be any THz emitter useful for THz TDS, such as, for example, a photoconductive antenna (e.g., a low-temperature-Gallium Arsenide (LT-GaAs) emitter, etc.), an electro-optic (EO) crystal, etc. The emitter is configured to receive the pump beam and to emit the THz reference pulse.

The system includes a detector 40 configured to receive the probe beam and to measure a THz sample pulse after the THz reference pulse interacts with the sample 90. For example, in some embodiments, such as that depicted in FIG. 2, the system is configured for transmission of the THz pulse through the sample. In such transmission configurations, the detector may detect a THz sample pulse after the reference pulse from the emitter 30 passes through the sample. In some embodiments, the system is configured for operation in a reflection arrangement. For example, the detector may be arranged to receive a THz sample pulse where the reference pulse from the emitter is reflected by the sample (e.g., by a surface of the sample, by a surface to a desired depth of the samples, etc.) The detector may be a detector antenna, such as a photoconductive antenna (e.g., an LT-GaAs detector), an EO crystal, or other detectors useful for THz-TDS.

A processor 50 is in electronic communication with the detector 40. The processor 50 is configured to obtain a measured sample pulse (i.e., a measurement of the sample pulse—a signal representing the measured sample pulse). The processor may also receive a measured reference pulse (i.e., a measurement of the reference pulse, for example, without a sample—a signal representing the measured reference pulse). The processor is configured to determine one or more imaging markers (a refractive index (n), absorption coefficient ($\alpha$), or both). The one or more imaging markers may be determined by minimizing an error (e.g., mean-squared error, etc.) between the obtained (measured) sample pulse and a modeled sample pulse ($E_{sam.model}$) in the time domain. The modeled sample pulse may be produced by passing the obtained (measured) reference pulse through a filter that parametrically models the influence of wave propagation through the sample. The filter may be a Fresnel function for a single dielectric layer in transmission geometry, such as, for example, the filter of eq. 3. Other filters may be used as further described below. Minimizing the error may be performed by maximum likelihood estimation.

In some embodiments, the system 10 further includes a stage 12 for moving the sample. For example, the system may include an automated translational stage system. The stage may be configured to move the sample along two dimensions—e.g., an x-y stage. The processor may be configured to obtain additional sample pulses at different locations of the sample, and to repeat the step of determining one or more imaging markers for each additional sample pulse. In this way, the system may be configured to provide results over the image area—e.g., 2D results. Order of operations may be such that an entire THz TDS scan is performed before the one or more imaging markers are determined or the one or more imaging markers may be determined during the acquisition of the THz TDS scan (e.g., for each sample point or otherwise). A distance between each sample location may be predetermined according to the application. For example, a step size may be in the range from 10 μm to 500 μm inclusive.

In some embodiments, the system is further configured to generate an image map based on the refractive index of each sample pulse location, an image map based on the absorption coefficient of each sample pulse location, or both image maps, which may be embodied in separate image maps or a consolidated image map having values for both refractive index and absorption coefficient.

The term processor is intended to be interpreted broadly. For example, in some embodiments, the processor includes one or more modules and/or components. Each module/component executed by the processor can be any combination of hardware-based module/component (e.g., graphics processing unit (GPU), a field-programmable gate array (FPGA), an application-specific integrated circuit (ASIC), a digital signal processor (DSP)), software-based module (e.g., a module of computer code stored in the memory and/or in the database, and/or executed at the processor), and/or a combination of hardware- and software-based modules. Each module/component executed by the processor is capable of performing one or more specific functions/operations as described herein. In some instances, the modules/components included and executed in the processor can be, for example, a process, application, virtual machine, and/or some other hardware or software module/component. The processor can be any suitable processor configured to run and/or execute those modules/components. The processor can be any suitable processing device configured to run and/or execute a set of instructions or code. For example, the processor can be a general-purpose processor, a central processing unit (CPU), an accelerated processing unit (APU), a field-programmable gate array (FPGA), an application-specific integrated circuit (ASIC), a digital signal processor (DSP), graphics processing unit (GPU), microprocessor, controller, microcontroller, and/or the like.

EXPERIMENTAL METHODS, MATERIALS, AND DATA ANALYSIS

The following discussion provides non-limiting examples based on experiments conducted using systems and methods according to the present disclosure. The methods, systems, and materials used are solely to illustrate such example embodiments.

THz-TDS Experimental Set-Up

Figure 3:
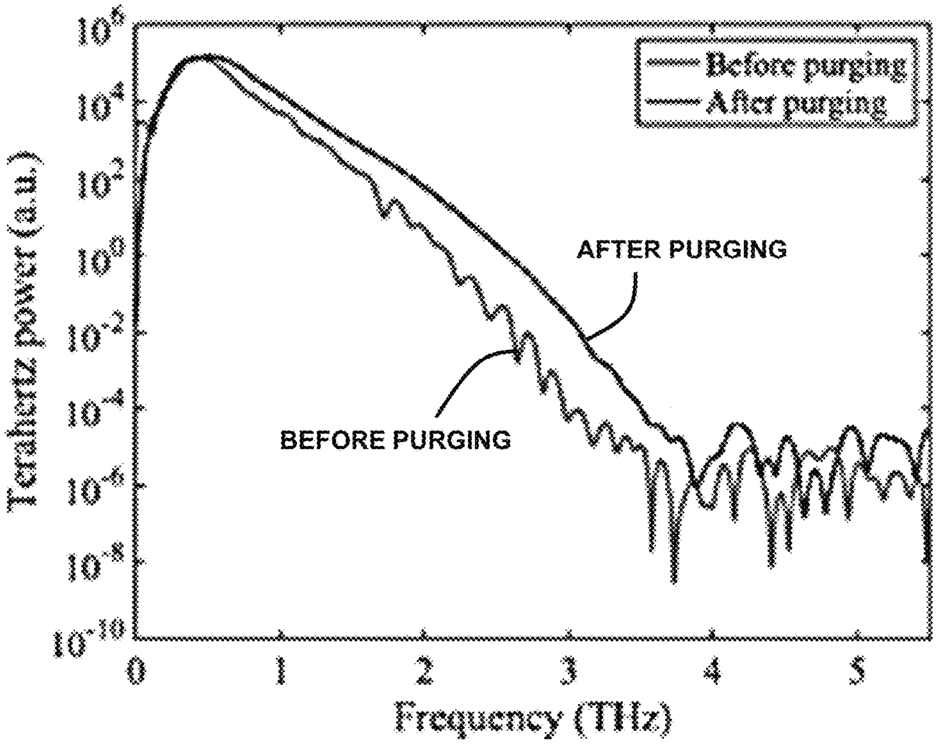
FIG. 3. THz FFT spectra of the empty setup (used as reference) before and after dry nitrogen purging, which may be used to remove the spectral features of atmospheric water vapor.

FIG. 2 presents a diagram of a non-limiting example system (the THz-TDS system used for all measurements in the example embodiments provided herein). A commercial mode-locked Ti:sapphire laser generated a train of 100 fs wide 800 nm wavelength optical pulses that was split by a 50:50 power ratio beam splitter into pump and probe beams. The pump beam, after passing a slow delay line, excited a commercial low-temperature-grown GaAs (LT-GaAs) THz emitter, while the probe beam was directed toward a commercial LT-GaAs detector antenna. Both the emitter and detector devices were equipped with hyper-hemispherical Si lenses to collimate the emitted THz beam and, subsequently, converge it into the detector. Two additional 1 cm focal length Teflon lenses were placed in front of the emitter and detector, respectively, to focus the THz signal into the sample under investigation and collect the transmitted one towards the detector. Note that in the probe beam path, a TRS-16 THZ registering system from TeraVil was used. This fast optical delay line enabled the direct collection of THz TD signals instead of using a conventional slow stepper motor-controlled delay line and a lock-in amplifier. The TRS-16 allowed for minimizing the signal acquisition time to approximately 30 s per pixel while acquiring an average of 1000 traces with 1.778 fs time resolution for each collected time-resolved signal to obtain a signal-to-noise ratio of 86.24 dB. The overall image acquisition time increases with the decrease in the number of step-size and the number of signal averages. The TRS-16 controller simultaneously displayed the TD waveform and the corresponding FFT spectrum. All experiments were performed inside a purged box made of acrylic with a constant dry-nitrogen flow to remove any spurious atmospheric water absorptions from the measured spectrum [see FIG. 3, black line]. As indicated in FIG. 2, the samples were studied in a transmission geometry by placing them at the THz radiation focal point between the emitter and detector on a stepper-motor-controlled x-y stage to perform scans. Before each tissue scan, an empty setup test (without any sample) was run and the result was used as a reference.

Sample Preparation.

Figure 4:
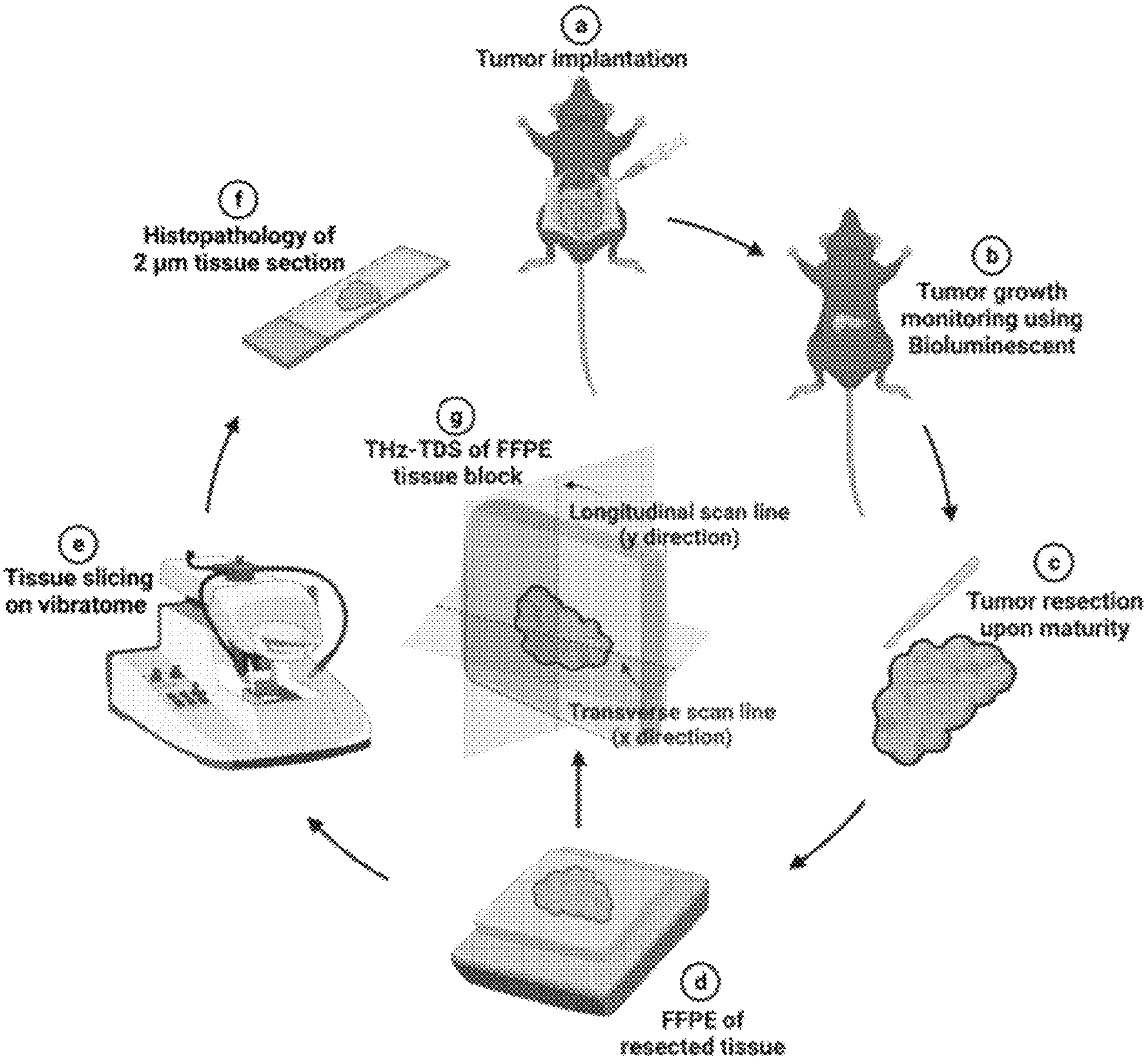
FIG. 4. An outline of an experimental design. (a) Tumor cells are injected in the pancreatic tail. (b) The growth of the tumor is monitored using bioluminescent imaging. (c) The tumor is resected after it's maturity. (d) The resected tumor is then formalin-fixed and paraffin-embedded for further measurement. (e) A 2 μm thin tissue is sliced on a vibratome. (f) This tissue section is used for histopathology. (g) About 4 mm thick formalin-fixed paraffin-embedded (FFPE) tissue is removed from the cassette for THz-TDS. Line scans are performed along transverse (x-direction) and longitudinal (y-direction) axes, forming a cross-section. Created with BioRender.com, agreement no. TV24VWYQAH.

FIG. 4 provides an outline of the sample preparation and experimental design. We orthotopically implanted KCKO pancreatic cancer cell lines stably expressing firefly luciferase (KCKO-luc) from the C57BL/6J background into mice. We anesthetized using an isoflurane anesthetic vaporizer (Scivena Scientific) and then we made a 10 mm laparotomy incision to expose the spleen and pancreas. Next, we suspended the cells in a 1:1 PBS/Matrigel (BD Biosciences) solution to inject 100,000 cells/mouse (100 mL) into the pancreatic tail. For 1 min after tumor cell injection, we put a cotton swab over the injection location to avoid peritoneal leakage and used IVIS (In Vivo Imaging System) bioluminescent imaging to monitor tumor growth and determine maturity. After the development of mature pancreatic tumors, the mice were sacrificed, and the tumors were resected for FFPE. We employed FFPE processing to reduce the substantial water absorption loss associated with highly vascular fresh tissue specimens. For this study, we used 4 mm thick paraffin-embedded murine tissues to eliminate the possibility of drying bare tissue samples when exposed to ambient conditions, particularly the dry-nitrogen atmosphere during THz-TDS experiments. Two tumor tissue blocks, one with a healthy pancreas region at its boundary and one without any healthy pancreas region, are reported in the present disclosure. The samples were ~400× thicker than the usual histopathology slides to avoid a Fabry-Perot etalon effect. Since the samples were thick enough to be free-standing, we could easily perform THz-TDS in a transmission geometry. In addition, we also sectioned the tissues to 5 μm thick specimens for hematoxylin/eosin (H&E) staining. At the data analysis stage, THz images were aligned to sequential sections stained with H&E.

Frequency-Domain (FD) Parameter Estimation Technique.

An advantage of the THz-TDS method is that it can probe the sample's contribution to both the amplitude and phase of the THz radiation, which makes it possible to evaluate the sample's optical parameters without employing Kramers-Kronig relations. This is, however, a double-edged sword when it comes to extraction of the optical parameters. The standard FD approach is to take a Fourier transform of both the sample and reference pulses and use the sample spectrum normalized to the reference one to obtain the complex transmission or reflection coefficients based on the geometry of the experimental setup and, next, use it in the following equation:

$$\frac{E_{sam}(\omega)}{E_{ref}(\omega)} = E(\omega)e^{i\varphi(\omega)} \tag{1}$$

where $E_{ref}$ and $E_{sam}$ are the Fourier transforms of the reference and the sample TD signals, respectively.

In our case of a thick sample the extinction coefficient <<1, so ignoring the Fabry-Perot terms, the complex transfer function can be written as the following approximated form using the Fresnel equation:

$$\frac{E_{sam}}{E_{ref}} = t = \frac{4n}{(n+1)^2}e^{i\omega d/c(1-n)-\alpha d/2} \text{ where } n = 1 - \frac{c}{\omega d}\varphi, \quad \alpha = -\frac{2}{d}\ln\left(\frac{(n+1)^2}{4n}E\right), \tag{2}$$

d stands for the sample thickness, c is the speed of light, and ω is the angular frequency. Hence, from eq. 2, the inverse problem can be solved, where both $E_{sam}(\omega)$ and $E_{ref}(\omega)$ are known quantities from the experiment and solving for n and Δ. This problem is traditionally answered analytically, assuming optically thick samples (nd>1.5 mm) and ignoring the phase term in the transmission coefficient and the losses during the pulse propagation. In this approach, one evaluates the real part of n by unwrapping the phase of $\tilde{t}$, which often introduces numerical instability.

Another approach taken in the literature is to solve this inverse problem iteratively by calculating n using the unwrapped phase and including an imaginary term to offset the loss difference. To do so, for each frequency, an error function with arbitrary weighting that contains both the modulus and phase error between the experimentally obtained and modeled transmission coefficients is minimized. Nonetheless, causality is not satisfied in this calculation, which ends up taking the shape of the Kramers-Kronig relation in the problem. This poses a substantial issue during the phase unwrapping because this is highly dependent on the dynamic range and, thus, is band limited. The latter is the principal draw back of the FD parameter extraction method, requiring further steps in phase unwrapping, since the phase gets lost beyond the dynamic range. The FD method is also limited by the arbitrary weighting of the phase and the amplitude in the error function. In literature, it has been reported that the signals transmitted through the cancer tissue regions appear to be highly attenuated, posing a substantial challenge in phase unwrapping.

Time-Domain (TD)) Maximum A Posteriori Probability (MAP) Parameter Estimation Technique To overcome the shortcomings of the FD parameter extraction approach. embodiments of the present disclosure may solve the inverse problem with full TD inversion. We consider the reference and the sample pulses, measured by THz-TDS, as a dynamical system. Hence, we adopt a transfer-function-based approach to extract the optical parameters. There are several advantages of solving the inverse problem in the TD with respect to FD. In TD, we can acquire high-signal-to-noise (SNR) experimental signals for both the sample and the reference with femtosecond time resolution and very low noise, which helps us have more accurate estimates of the tissue n and α parameters. Therefore, we describe the estimation problem as the root-mean-square difference of the experimental sample signal and the modeled sample trace from the reference. Thus, we project this as a MAP estimation problem. Similar time-domain minimization strategies for inverse problems in medical imaging have been demonstrated in ultrasound elasticity imaging to provide reliable estimates in ultrasound-based rheological parameter inversion.

In order to express the MAP estimator for the pulsed THz-TDS experiment, we traverse the reference pulse $E_{ref}$ through a filter $K_\theta$, which parametrically simulates the effect of the THz propagation through a sample to generate a modeled sample pulse. Then, using the difference between the experimental sample pulse $E_{sam}$ and the modeled sample pulse as an objective function, we optimize the filter parameters. We treat $K_\theta$ as a continuous function for the sake of convenience. In the present model, $K_\theta=\Gamma(n^*(\theta_m), E_{ref}, E_{sam})$, where $n^*(\theta_m)$ is the complex n, while $\theta_m$ denotes a subset of parameters that describe the system and is regulated by the type of the model applied. Thus, the exact expression of the filter function depends on the dielectric model under consideration. For simplicity, we chose a Fresnel equation for a single dielectric layer in transmission geometry, so for a thick sample, $K_\theta$ takes the following form:

$$K_\theta(\omega) = \beta\frac{4n}{(n+1)^2}e^{i\omega d/c(1-n)-\alpha d/2} \tag{3}$$

where β is the amplitude scaling factor treated as Gaussian distribution of white noise, which is incorporated to compensate for variations in the reference pulse and the incident laser train amplitude fluctuations. We note that the pump beam power and low-frequency amplitude fluctuations are the major sources of noise in the THz-TDS system, and using the TD approach we can perform the noise modeling in a much simpler way, which is not possible in the FD analysis. The other benefit of the MAP method is that the filter function $K_\theta$ is modular in a sense that the system identification approach can be extended to include Fabry-Perot reflections and complex geometry conditions. For simplicity, in the present study, we use the Fresnel transfer function without the Fabry-Perot effect, but the same routine could be adapted for measurements in a reflection geometry, or studying multilayer samples, by simply changing the transfer function, or by adding the higher order Fabry-Perot terms. A general form of filter in transmission geometry, without any approximation, may be given by:

$$K_\theta(\omega) = \beta\frac{4\left(n - i\frac{c\alpha}{2\omega}\right)}{\left(n - i\frac{c\alpha}{2\omega} + 1\right)^2} \times \frac{e^{-i\frac{\omega}{c}\left(n - i\frac{c\alpha}{2\omega} - 1\right)d}}{1 - \left(\frac{n - i\frac{c\alpha}{2\omega} - 1}{n - i\frac{c\alpha}{2\omega} + 1}e^{-i\frac{\omega}{c}\left(n - i\frac{c\alpha}{2\omega}\right)d}\right)} \tag{3a}$$

A general form of filter in reflection geometry, without any approximation, may be given by:

$$K_\theta(\omega) = \beta\frac{1 - n - i\frac{c\alpha}{2\omega}}{1 + n - i\frac{c\alpha}{2\omega}} \times \frac{1 - e^{-2i\frac{\omega}{c}\left(n - i\frac{c\alpha}{2\omega} - 1\right)d}}{1 - \left(\frac{n - i\frac{c\alpha}{2\omega} - 1}{n - i\frac{c\alpha}{2\omega} + 1}e^{-i\frac{\omega}{c}\left(n - i\frac{c\alpha}{2\omega}\right)d}\right)^2} \tag{3b}$$

The next step is the maximum likelihood estimation (MLE) process to best estimate the parameter values that transform $E_{ref}$ and $E_{sam}$, assuming uniform priors of n and α over the reconstructed parameters. It is noted that the amplitude scaling factor β was not an a priori known parameter but instead a posteriori derived. We then solve for the posterior probability of these parameters by using the time-domain minimization. For a particular point scan, knowing $E_{ref}$ and d, we can construct the estimation problem in TD as the sum of mean-squared errors (MSEs) of the experimental trace and the modeled trace, shown as:

$$\hat{\theta}_{(n,\alpha)} = \left\|E_{sam} - F^{-1}\{K_\theta \cdot F\{E_{ref}\}\}\right\|^2 \tag{4}$$

Figure 5:
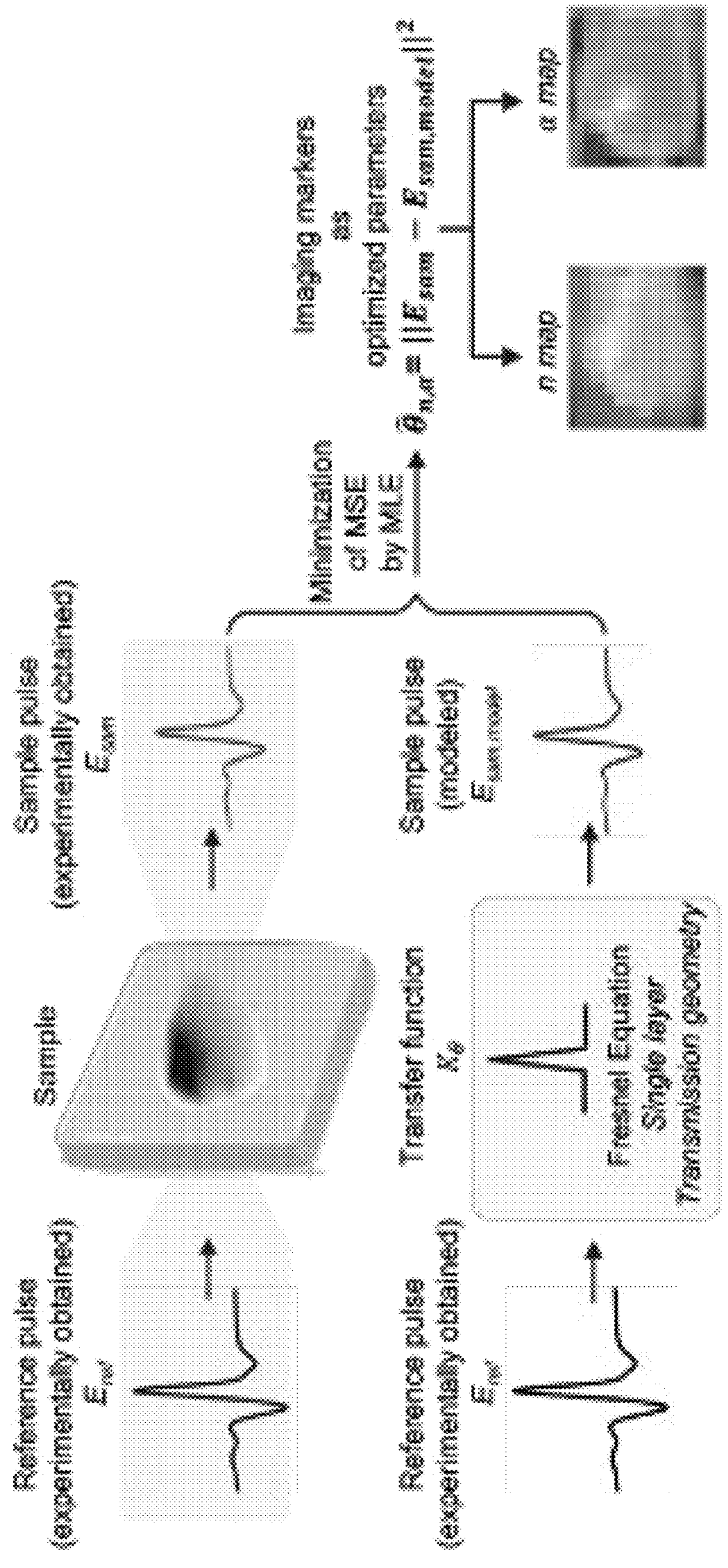
FIG. 5. A block diagram of an example MAP algorithm implementation according to an embodiment of the present disclosure. A sample pulse $E_{sam}$ is obtained from THz-TDS experiment for one scan point. A transfer function $K_\theta$ is designed based on the Fresnel transmission coefficient for a single-layer approximation to reconstruct a parametrically modeled pulse $E_{sam,\ model}$. A minimization algorithm of the two pulses, i.e., $E_{sam}$ and $E_{sam,model}$, is performed using the mean-squared error (MSE) method to extract the optimized values of n and α. The process is repeated for all scan points to generate a THz map of the sample using the optimized n and α as imaging markers. Created with BioRender.com, agreement no. OV24VWZD5O.

The right-hand term of eq. 4 is the difference between an experimental $E_{sam}(t)$ pulse and the $E_{sam.model}$ (t) one, reconstructed in TD from $E_{ref}$. We first transform $E_{ref}(t)$ to its frequency-equivalent $\hat{E}_{ref}(\omega)$ using a temporal FFT operator F and multiply it by the impulse-function, which in our case is the Fresnel operator $K_\theta(\omega)$ defined in eq 3. Next, we transform the $K_\theta\hat{E}_{ref}(\omega)$ product back to TD using the inverse $F^{-1}$ operator and, finally, compute the $l^2$ norm of the residual. MLE yields estimations of the Fresnel parameters $\theta_{n,\alpha}$, so the problem reduces to a two-parameter model and these parameters driving the impulse transform are the optical parameters of interest, namely, n and α $[\theta_m \rightarrow \theta_m(n, \alpha)]$. A block diagram of the MAP algorithm is presented in FIG. 5.

The MLE reconstruction of a pulse transmitted through our tissue sample is mathematically implemented using a nonlinear least-squares routine in MATLAB (R2021a). In this work, we select a simple gradient-free Nelder-Mead optimization algorithm because of its robustness and easy convergence. This method calculates a new error function (the $l^2$ norm) at each iteration based on the current values of the parameters of interest and allows solving the problem for determining a parameter update by completing each iteration. This method gives LI-regularized estimates that can effectively deal with zeroes or large numbers in the solving equation. Since most optimization routines are sensitive to the prior values in order to achieve the global minima, we select initial parameters that are close to the globally optimized parameters. For this, we use the prior values of n and α calculated from the regular FD analysis at their center frequency. After the optimization is completed, we register the optimized values of n and α, which are the average values within the usable frequency range and use them as markers for differentiation of the studied sample characteristics to ensure reproducibility of findings and subsequent biological significance.

Results

Figure 6:
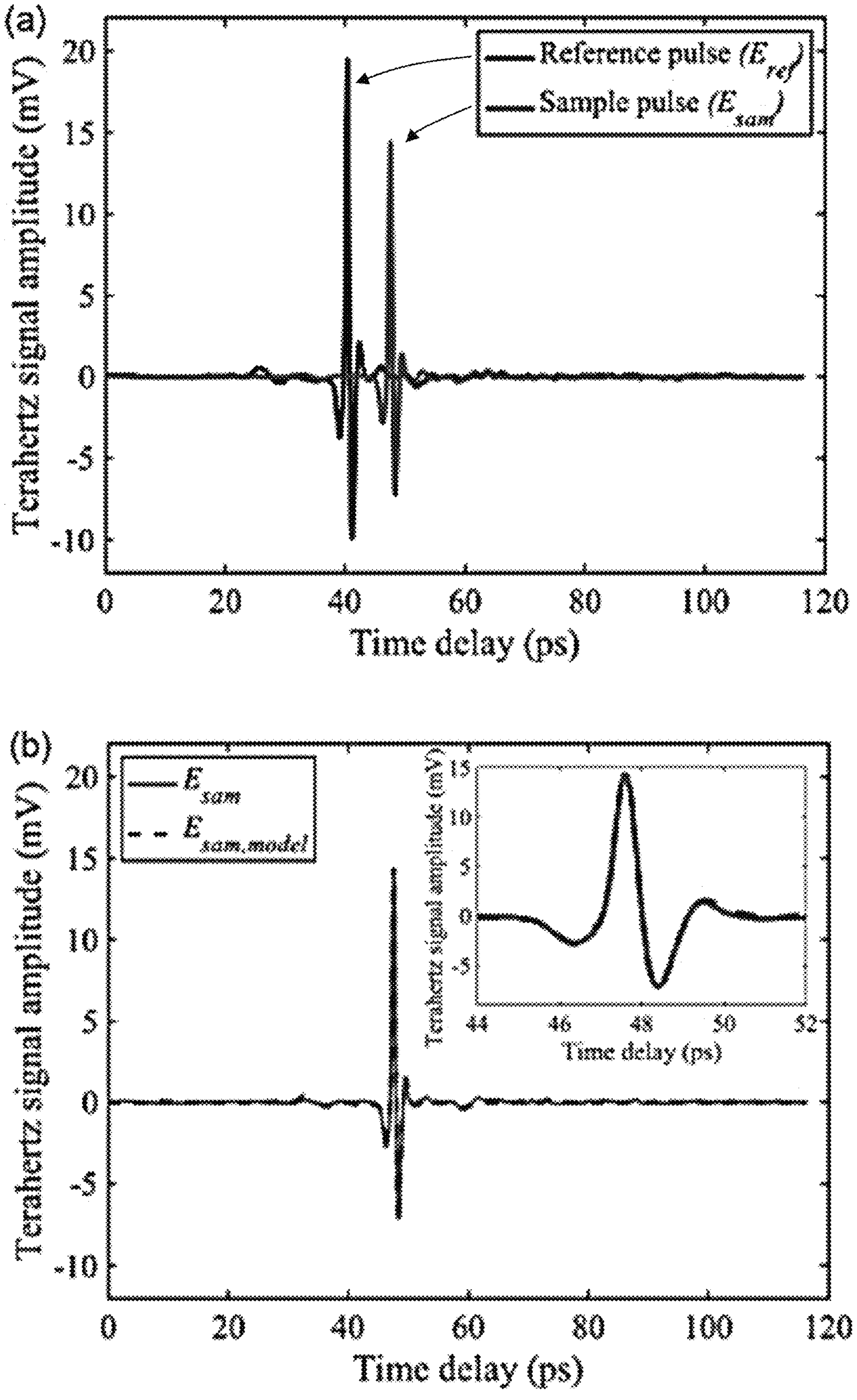
FIG. 6. (*a*) THz time-domain traces of the reference $E_{ref}$ (empty setup) and sample $E_{sam}$ signals that were obtained experimentally. (b) The modeled time-domain signal constructed using MAP ($E_{sam,model}$) overlaps with the experimentally obtained THz-TDS sample trace ($E_{sam}$) (line the same as that in FIG. 5(*a*)) for the same sample. An overlap of the two signals is confirmed by the inset in (b), which shows a zoomed-in view of $E_{sam,model}$ and $E_{sam}$ close to the main peak position.

FIG. 6(*a*) shows THz time-domain experimental transients measured in the example THz-TDS system [FIG. 2]. The black trace corresponds to an empty setup and is denoted as $E_{ref}$, while $E_{sam}$ (red trace) is the signal transmitted through a sample. As expected, the signal transmitted through the test sample is attenuated and shifted in time, as compared to $E_{ref}$. FIG. 6(*b*) compares the experimental $E_{sam}$ trace, the same as that in FIG. 6(*a*), and the modeled sampled trace $E_{sam,model}$ (dashed blue line) using MAP. We note that the sample pulse from the experiment and the modeled pulse overlaps, what is clearly visible in FIG. 6(*b*) inset. Calculations of $E_{sam,model}$ include the scaling factor β (see eq. 3) that takes care of the noise effect and the algorithm described in above converged at a numerical tolerance of $1e^{-8}$. The test result presented in FIG. 6(*b*) demonstrates that using the MAP approach to solve the inverse problem in THz-TDS studies indeed provides an excellent convergence without any spurious artifacts.

MAP PDAC Imaging: Transverse and Longitudinal Scans

Figure 7:
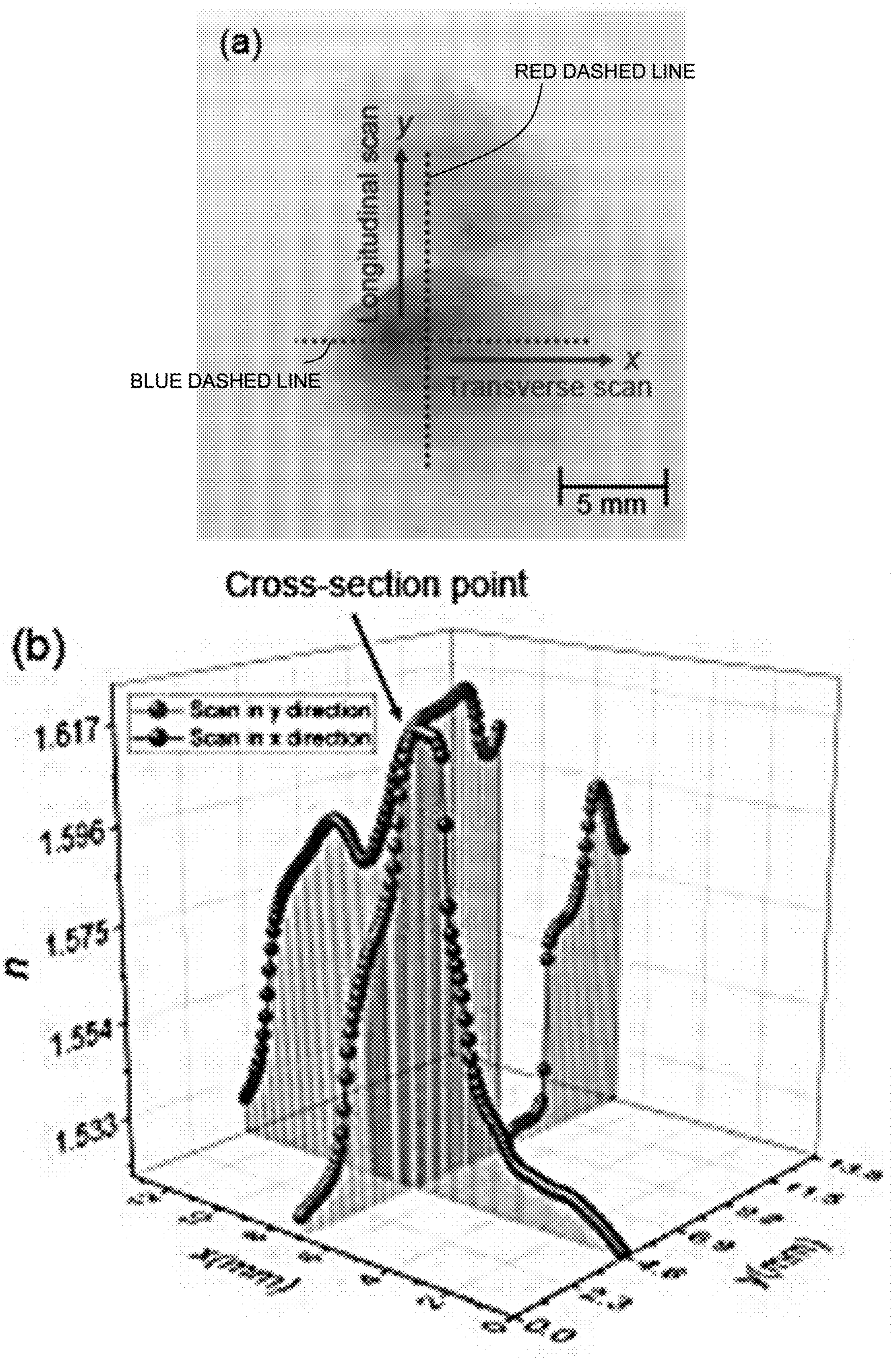
FIG. 7. Transverse (x-direction) and longitudinal (y-direction) line scans of a paraffin-embedded pancreas tissue with PDAC. (a) Optical micrograph with scan lines indicated. (b) Refractive index values across the scan lines obtained using our MAP technique. (c) Absorption coefficient values across the scan lines obtained using our MAP technique. At the cross-section points (see arrows), the imaging markers' values overlap, ensuring the repeatability of the measurement.
Figure 7:
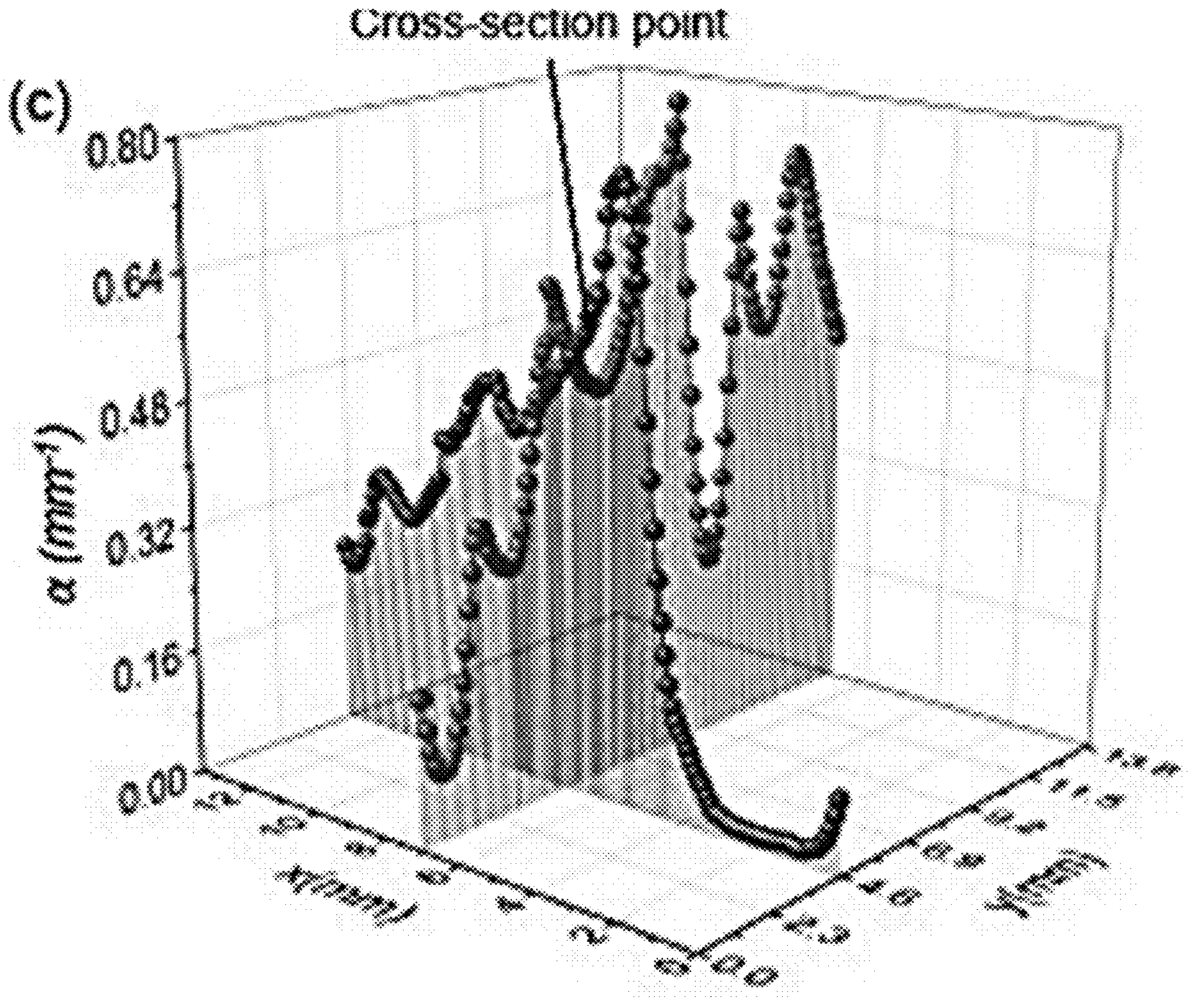

We made two cross-sectional scans on a 4 mm thick paraffin embedded PDAC tissue with the 100 μm step size in both transverse (x) and longitudinal (y) directions [see also FIG. 4(*g*)], shown in FIG. 7(*a*) as blue and red dashed lines superimposed on an optical image of the studied tissue. The position and the length of each dashed line correspond to the position and length of the performed linear scans, respectively. Each scan point includes a TD THz pulse with 1000 averages, and from each pulse we extracted the imaging markers, i.e., n and α, using the MAP estimation technique. Next, we mapped out values of these parameters on two cross-sectional scans of the sample, presented as three-dimensional plots shown in FIGS. 7(*b*) and (*c*) for n and α, respectively. We notice that the tissue edges are well resolved, especially in the y-scan, when n drops sharply at a narrow paraffin region between two tissue nodules [see also FIG. 7(*a*)]. The THz refractive index of the paraffin found by the MAP technique closely matches the literature value. The values of n and α changing within the tissue regions can help unveil changes in the tissue microenvironment, such as normal/tumor tissue boundaries, by tracing the corresponding values. Finally, at intersection points between the x- and y-scans, indicated by arrows in both FIGS. 7(*b*) and (*c*), the values of n and α, respectively. match precisely with each other. We have an additional confirmation that the proposed MAP parameter extraction method gives unbiased and reproducible results, since the y-scan is taken around 5 h after the x-scan. Hence the exact same values of the two imaging markers at the intersection points indicate the long-term stability and unbiases of the method, as n and α are both physical parameters unlike peak amplitude and spectral peak, which are heavily dependent on the stability of the THz-TDS system, especially the stability of the laser power.

THz-TDS MAP PDAC Imaging

Figure 8:
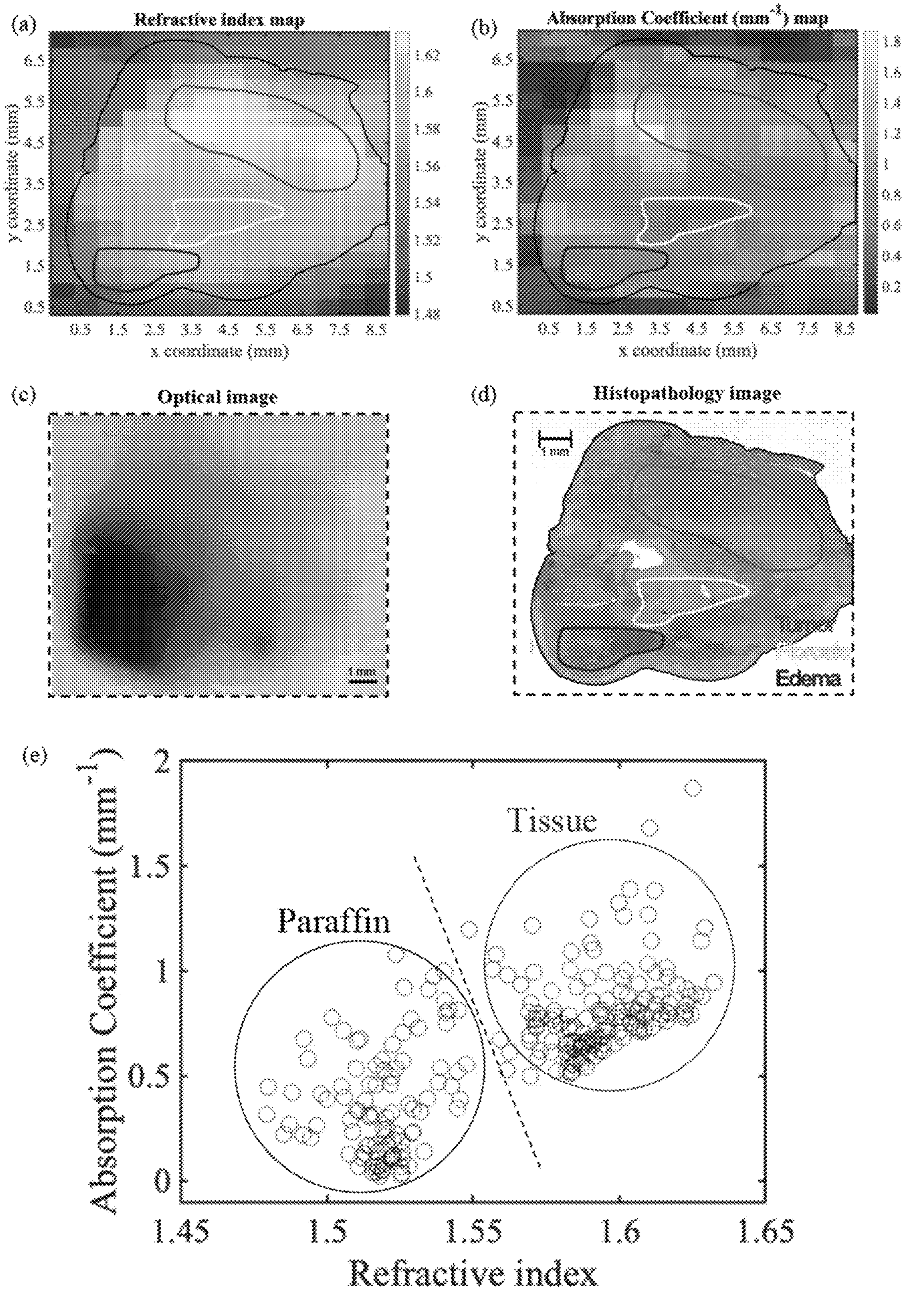
FIG. 8. Two-dimensional images of (a) the refractive index and (b) the absorption coefficient, the THz imaging markers extracted using MAP for an example paraffin-embedded PDAC tissue. (c) Optical image of the tested sample with the area corresponding directly to the size of the scans. (d) H&E-stained histopathology image of the sample with different regions indicated. (e) Plot of absorption coefficients of two imaging markers vs refractive index, showing two different clusters for the paraffin and the tissue regions.

Two-Dimensional Raster Scans. Panels a and b in FIG. 8 present two-dimensional (2D) images of a paraffin-embedded PDAC-only tissue using our optimized imaging markers, namely, n and α, respectively. For completeness, we also added in FIG. 8 an optical image of the studied PDAC tissue [FIG. 8(*c*)] and the corresponding histopathological image [FIG. 8(*d*)]. Because of the manual x-y stage movement used in the experiment, the tissue was scanned with a 500 μm long step size: hence, the maps are highly pixelated. However, the tissue edges are clearly resolved. To assess the efficacy of THz imaging in mapping different features, bulk regions of tumor, fibrosis, and edema were defined using H&E-stained tissue sections [FIG. 8(*d*)], and annotations were translated to refractive index [FIG. 8(*a*)] and absorption coefficient [FIG. 8(*b*)] maps generated from THz imaging on a neighboring section. It is well established that the composition of the PDAC tumor microenvironment is highly heterogeneous. The density and spatial distribution of several features can vary greatly between tumors, including regions of tumor, necrosis, fibrosis, immune infiltrate, and edema. It is worth mentioning that histopathology employed a much greater resolution to study the tissue with better precision, allowing for a closer examination at the cellular level to determine the distinct subregions within the tissue. The THz maps show that the dark blue areas in FIG. 8(*a* and *b*) represent n and α of pure paraffin, respectively, whereas the "warmer" colors indicate the denser (higher n) and more absorbent (higher α) regions. It can be noted that within the tissue region a highly heterogeneous structure can be identified in both n and α maps. Comparing the H&E-stained histopathology image [FIG. 8(*d*)] with the refractive index map [FIG. 8(*a*)], we note that the tumor region exhibits an average n of 1.617 (±0.004), which is higher than those in the other regions identified as fibrosis and edema with average n values of 1.584(±0.002) and 1.571(±0.002), respectively. Upon comparing the histopathology map [FIG. 8(*d*)] with the absorption coefficient map [FIG. 8(*b*)], we note that the tumor region has a higher α value [1.011 $mm^{-1}$ (±0.004)] compared to those of fibrosis, [0.667 $mm^{-1}$ (±0.002)] and edema [0.664 $mm^{-1}$ (±0.005)]. Overall, the tumor regions appear to be "warmer" because of the higher refractive index and absorption coefficient. The high n and α values of the tumor region compared to the other subregions is consistent with the trend reported in the literature for other types of malignancies such as breast tumor models. An optical tissue image [FIG. 8(*c*)] has a dark spot in the bottom left side, which is due to tissue hemorrhage. This spot has no correlation to either the H&E-stained image or the THz maps. Finally, FIG. 8(*e*) shows the n vs α plot, and we note that the imaging markers form two distinct clusters, namely, the paraffin and the tissue ones.

DISCUSSION

Figure 9:
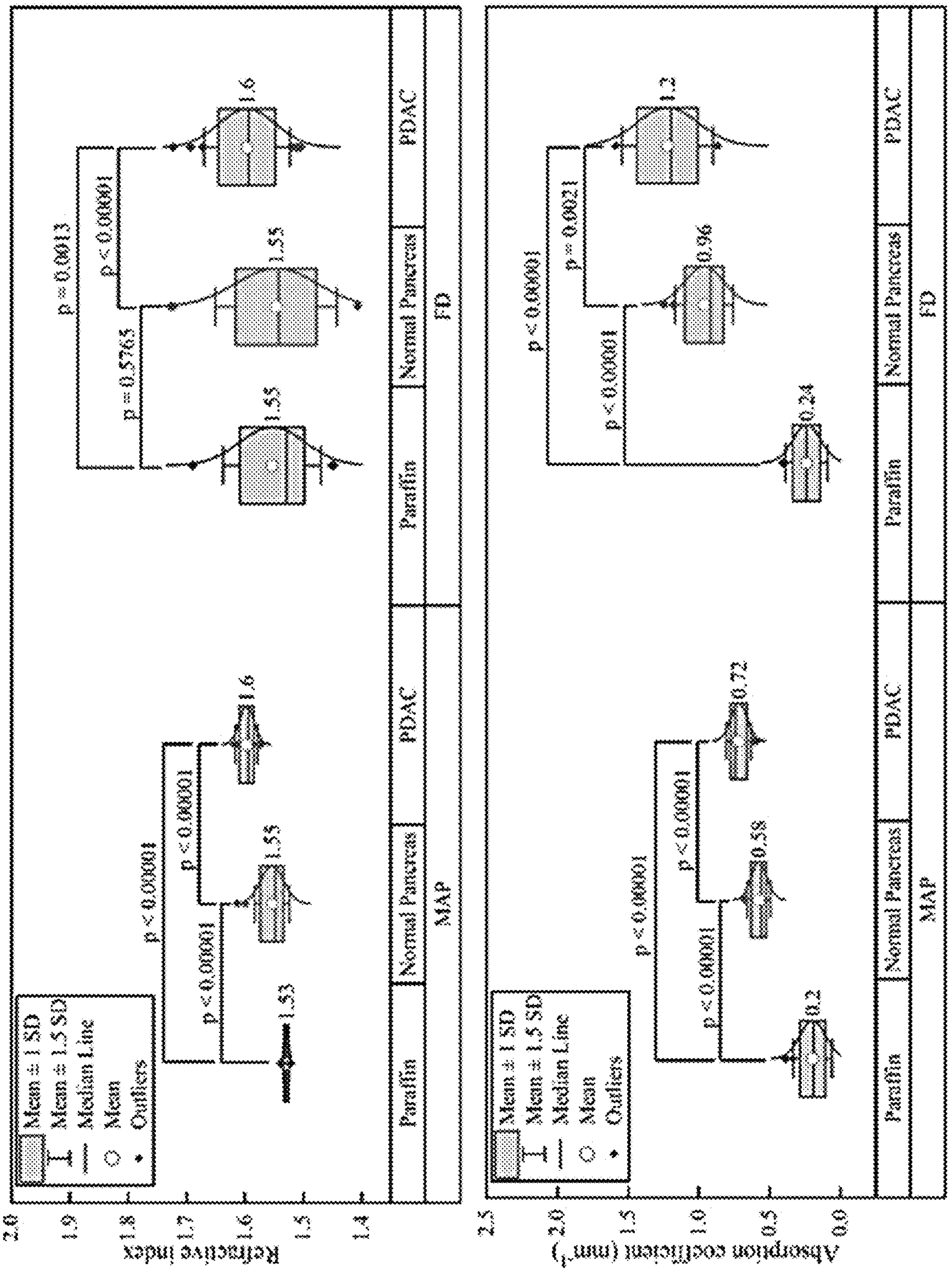
FIG. 9. Boxplots showing the comparison of optimized THz imaging markers extracted from MAP (left side of the plot) and FD (right side of the plot) extraction methods, averaged over 50 scan points per trace for pure paraffin, normal pancreas, and PDAC within the same tissue sample under examination, with the p-values indicated for the 1000 measurement average for the refractive index n (upper panel) and the absorption coefficient α (lower panel). The 25th and 75th percentiles are represented by the lower and upper box boundaries, respectively, and the median value is indicated by the straight line inside each box. Next to each box is the respective mean values. Each box also has the data's Gaussian distribution added next to it.
Figure 11:
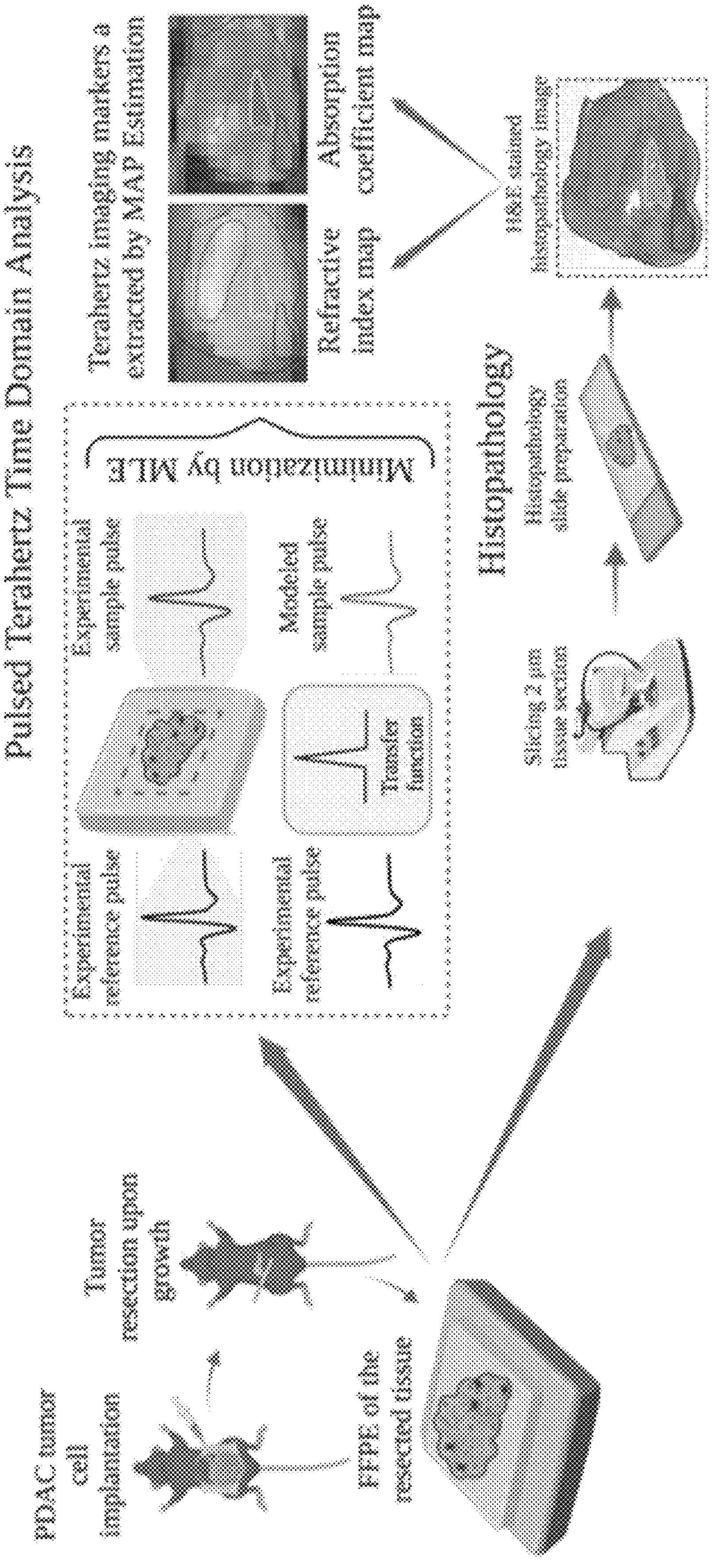
FIG. 11. A diagrammatical overview of an experimental embodiment of the present disclosure.

For completeness of our work, we calculated and present here a comparison between the imaging markers obtained using MAP and FD techniques for paraffin-embedded normal and PDAC regions in a form of boxplot representation, as shown in FIG. 9. It is clearly visible that both imaging markers obtained from MAP exhibit a narrower standard deviation as compared to those obtained from FD analysis, implying that MAP gives a significantly more robust estimation of the imaging markers. In case of MAP, the three material groups, i.e., pure paraffin, normal tissue, and PDAC, exhibit statistically significant values with $p<0.00001$ in both the cases of n and $\alpha$. As a result, as these two parameters n and $\alpha$ obtained using MAP can offer statistically significant estimates, we suggest using them as imaging markers for identifying tissue regions in extremely complex and heterogeneous biological microenvironments.

Table 1 (FIG. 10), in turn, compares our MAP-based n and $\alpha$ parameters to other imaging markers reported in the literature to present the tissue characteristics for tumor imaging with THz-TDS. Again, we present the results based on the characterization of our paraffin-embedded pancreas tissues. Each row corresponds to a particular sample group (paraffin, normal pancreas, and PDAC), while each column corresponds to a particular feature or an imaging marker. Since different imaging markers have different units, we chose to look at the coefficient of variation (CV) [FIG. 10—Table 1(a)] defined as the ratio between standard deviation and mean value. The CV does not depend on the dimension or unit of the imaging markers. In addition, in FIG. 10—Table 1(b), we present the interquartile range (IQR) defined as the difference in the 25th and 75th percentiles of a given data set.

Table 1(*a*) (FIG. 10) shows that n obtained from MAP has the lowest CV for a particular sample group. The value is approximately two orders of magnitude smaller than the rest of the features, ensuring that the spread of data points for n from the MAP is low compared to its mean value. The CV for the n from FD has a larger value due to the inconsistent values extracted from FD due to the phase unwrapping issue. The second-lowest value of CV is obtained for a values extracted for MAP for the normal pancreas and PDAC, which means that the standard deviation is high compared to its mean value. CV for $\alpha$ has a higher value than the other markers, which might seem counterintuitive. However, the reason is that the standard deviation of a for paraffin is very low compared to its mean because paraffin is an inorganic sample, which is also evident from the boxplot presented in FIG. 9. Therefore, we conclude that imaging markers n and $\alpha$ derived using the MAP approach are the best choice when compared to traditional imaging markers, since the lower the CV value means the more precise estimate of the marker.

Table 1(b) (FIG. 10) demonstrates that the IQR follows a similar trend to CV, i.e., the IQR has its lowest value for n and $\alpha$ extracted from MAP, when compared to the other markers, ensuring less dispersion in the data points while classifying normal and tumor regions within the pancreas. As a result, the THz properties n and $\alpha$ of materials obtained through MAP provide the most conservative estimates. Hence, they are the excellent classifiers to differentiate the tumor and healthy regions in the pancreatic tissue.

CONCLUSION

In conclusion, we established a set of imaging markers, n and $\alpha$, by performing the MAP estimation process on experimental THz transients collected using the THz-TDS technique. We have demonstrated that this MAP-based THz parameter extraction pipeline can effectively return THz-regime parameters of the tissue by only knowing TD THz traces that uniquely map characteristics of the sample-under-investigation. We validated the effectiveness of our algorithm by performing cross-sectional line scans of PDAC as well as normal tissue samples encapsulated in paraffin. We extrapolated our method to achieve 2D raster scans of a pancreatic tissue sample with different anatomical regions to show that even subtle changes in the tissue microenvironment markedly impacted the tissue optical properties in the THz range. We can map those changes using the markers extracted from the MAP. Thus, our work intends to establish standardized imaging markers for THz imaging of PDAC tissue to enable a reproducible and unbiased analysis of THz-TDS measurements. Our mathematical approach should be valid for any tissue samples studied using the transient THz spectroscopy method. This work demonstrates applicability of the THz-TDS imaging method for examination of subregions of a complex tumor case such as pancreatic ductal of adenocarcinoma and shows the potential of THz imaging as an ex vivo imaging platform for objectively mapping tumor responses. One potential limitation of this work is that we need to select initial parameters close to the global optimized parameters to achieve global minima. Another limitation is that we have to evaluate the parameters for each pixel from a TD trace taken for that pixel, making the entire evaluation and image mapping computationally heavy and time consuming. We intend to address these issues in our future work by employing more cost- and time-efficient methods, by, e.g., parallelizing our code.

In the experimental embodiment, the THz line-scans and THz maps were generated by manually moving the x-y stage and, subsequently, saving the signal information at each pixel location. Some embodiments may use an automated translational stage system with reduced scan step size to improve the spatial resolution as well as increase the data acquisition speed. This will enable the production of high-resolution, large-area THz images that can be used to identify tissue sub-regions with clearly defined borders between them. Embodiments of the present disclosure may be used for THz path modeling through pancreatic tissue with complex heterogeneity to probe the tumor microenvironment's subtleties by understanding the nature of THz interaction with the tissue. Embodiments of the present disclosure may advantageously use substrate tissue matching, as the substrate may play a role in the reconstruction of the THz imaging markers of the tissues. In conclusion, our experiments were conducted utilizing a commercial large-footprint Ti:sapphire laser on an optical table. Other femtosecond fiber lasers may be used, some of which are more compact. Utilizing these lasers, the entire THz-TDS system has the potential to be designed as a compact, portable unit.

Embodiments of the present disclosure may be used to improve diagnosis, evaluate the effectiveness of a treatment (e.g., SBRT, chemotherapy, etc.), or in other ways. For example, the present techniques may be used to look for areas of DNA damage. In another example, the present techniques may be used to evaluate skin hydration. In another example, the present techniques may be used to evaluate tissue viability, for example, in burn victims.

It is noted that index of refraction is related to permittivity, so an imaging marker may be described in terms of dielectric function (complex permittivity) as an equivalent of refractive index. As such, the use of the term refractive index is intended to include the use of dielectric function.

Although the present disclosure has been described with respect to one or more particular embodiments, it will be understood that other embodiments of the present disclosure may be made without departing from the spirit and scope of the present disclosure.

We claim:

1. A method for extracting one or more imaging markers of a THz-TDS scan, the method comprising:

obtaining an image of a sample using pulsed terahertz time-domain spectroscopy; and determining the one or more imaging markers using a maximum a posteriori probability (MAP) estimation applied to the obtained image.

2. The method of claim 1, wherein the one or more imaging markers are refractive index (n), absorption coefficient (α), or both.

3. The method of claim 2, wherein determining the one or more imaging markers further comprises minimizing an error between the obtained image ($E_{sam}$) and a modeled image ($E_{sam.model}$) in the time domain, wherein the modeled image is produced by passing a reference pulse ($E_{ref}$) through a filter that parametrically models the influence of wave propagation through the sample.

4. The method of claim 3, wherein the filter is a Fresnel function for a single dielectric layer in transmission geometry.

5. The method of claim 4, wherein the filter function ($K_\theta$) is:

$$K_\theta(\omega) = \beta\frac{4n}{(n+1)^2}e^{i\omega d/c(1-n)-\alpha d/2}$$

where β is the amplitude scaling factor treated as Gaussian distribution of white noise, ω is angular frequency, d is sample thickness, and c is the speed of light.

6. The method of claim 3, wherein minimizing the error is performed according to:

$$\hat{\theta}_{(n,\alpha)} = \left\|E_{sam} - F^{-1}\{K_\theta \cdot F\{E_{ref}\}\}\right\|^2$$

where F is a fast Fourier transform (FFT) operator.

7. The method of claim 3, wherein the minimized error is a mean-squared error.

8. The method of claim 3, wherein the error is minimized using maximum likelihood estimation.

9. The method of claim 2, further comprising generating an image map based on the refractive index, an image map based on the absorption coefficient, or both.

10. A system for THz time domain spectroscopy of a sample, comprising:

a pulsed radiation generator for generating a probe beam and a pump beam;

an emitter configured to receive the pump beam and emit a THz reference pulse ($E_{ref}$);

a detector configured to receive the probe beam and measure a THz sample pulse ($E_{sam}$) after the THz reference pulse interacts with the sample;

a spectrometer for measuring the THz sample pulse and THz reference pulse; and a processor in electronic communication with the detector, the processor configured to:

obtain, from the detector, the measured sample pulse;

obtain, from the detector, the measured reference pulse; and determine a refractive index (n), an absorption coefficient (α), or both by minimizing an error between the obtained sample pulse and a modeled sample pulse ($E_{sam.model}$) in the time domain, wherein the modeled sample pulse is produced by passing the reference pulse through a filter that parametrically models the influence of wave propagation through the sample.

11. The system of claim 10, further comprising a stage for moving the sample.

12. The system of claim 11, wherein the processor is configured to obtain additional sample pulses at different locations of the sample, and to repeat the step of determining a refractive index, an absorption coefficient, or both for each additional sample pulse.

13. The system of claim 12, wherein the processor is further configured to generate an image map based on the refractive index of each sample pulse location, an image map based on the absorption coefficient of each sample pulse location, or both.

14. The system of claim 10, wherein the filter is a Fresnel function for a single dielectric layer in transmission geometry.

15. The system of claim 14, wherein the filter function ($K_\theta$) is:

$$K_\theta(\omega) = \beta\frac{4n}{(n+1)^2}e^{i\omega d/c(1-n)-\alpha d/2}$$

where β is the amplitude scaling factor treated as Gaussian distribution of white noise, ω is angular frequency, d is sample thickness, and c is the speed of light.

16. The system of claim 14, wherein minimizing the error is performed according to:

$$\hat{\theta}_{(n,\alpha)} = \left\|E_{sam} - F^{-1}\{K_\theta \cdot F\{E_{ref}\}\}\right\|^2$$

where F is a fast Fourier transform (FFT) operator.

17. The system of claim 14, wherein the minimized error is a mean-squared error.

18. The system of claim 14, wherein the error is minimized using maximum likelihood estimation.

* * * * *